(12) United States Patent
Matsuda

(10) Patent No.: US 10,279,427 B2
(45) Date of Patent: May 7, 2019

(54) BEAM DISTRIBUTOR

(71) Applicant: FANUC CORPORATION, Yamanashi (JP)

(72) Inventor: Munekazu Matsuda, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 15/786,638

(22) Filed: Oct. 18, 2017

(65) Prior Publication Data
US 2018/0104769 A1 Apr. 19, 2018

(30) Foreign Application Priority Data

Oct. 19, 2016 (JP) .................... 2016-205260

(51) Int. Cl.
*B23K 26/067* (2006.01)
*B23K 26/06* (2014.01)
(Continued)

(52) U.S. Cl.
CPC ...... *B23K 26/0676* (2013.01); *B23K 26/0648* (2013.01); *B23K 26/0652* (2013.01);
(Continued)

(58) Field of Classification Search
CPC ............ B23K 26/0648; B23K 26/0652; B23K 26/073; B23K 26/0738; B23K 26/0676;
(Continued)

(56) References Cited

U.S. PATENT DOCUMENTS 3,909,380 A * 9/1975 Day ................. G01N 27/44721
 204/549
4,283,113 A * 8/1981 Eden ........................ G02F 1/19
 356/28.5

(Continued)

FOREIGN PATENT DOCUMENTS

CN 1675020 A 9/2005
JP S63-071823 A 4/1988
(Continued)

OTHER PUBLICATIONS

An Office Action mailed by the State Intellectual Property Office of the People's Republic of China dated Sep. 19, 2018, which corresponds to Chinese Patent Application No. 201710971514.5 and is related to U.S. Appl. No. 15/786,638; with partial English translation.

(Continued)

*Primary Examiner* — Eric S Stapleton
(74) *Attorney, Agent, or Firm* — Studebaker & Brackett PC

(57) ABSTRACT

A rectilinear beam distributor capable of maintaining visibility of visible light emitted from a guide laser is provided. In a beam distributor, a beam direction changing unit has a dichroic property that the beam direction changing unit reflects an incident beam and transmits a visible light. A guide laser is disposed so as to move with movement of the beam direction changing unit in an optical axis direction of the incident beam when oscillating the visible light so that the visible light passes through the beam direction changing unit and the optical axis thereof is identical to a reflection beam.

8 Claims, 3 Drawing Sheets

(51) Int. Cl.
*B23K 26/073* (2006.01)
*G02B 26/08* (2006.01)
*G02B 27/14* (2006.01)

(52) U.S. Cl.
CPC ........ *B23K 26/073* (2013.01); *B23K 26/0738* (2013.01); *G02B 26/08* (2013.01); *G02B 26/0816* (2013.01); *G02B 27/141* (2013.01)

(58) Field of Classification Search
CPC ... G02B 26/08; G02B 26/0816; G02B 27/141
USPC .................................................. 219/121.77
See application file for complete search history.

(56) References Cited

U.S. PATENT DOCUMENTS

| | | | | |
|---|---|---|---|---|
| 4,675,500 A * | 6/1987 | Kunz | B23K 26/06 | 219/121.73 |
| 4,701,591 A * | 10/1987 | Masaki | B23K 26/0673 | 219/121.61 |
| 4,725,854 A * | 2/1988 | Ohtsuka | H01S 5/024 | 347/247 |
| 5,420,946 A * | 5/1995 | Tsai | G02B 6/352 | 385/16 |
| 5,498,849 A * | 3/1996 | Isshiki | B23K 26/03 | 219/121.64 |
| 5,643,249 A * | 7/1997 | Amano | A61F 9/00804 | 606/4 |
| 5,920,667 A * | 7/1999 | Tiao | G02B 6/32 | 385/22 |
| 5,948,291 A * | 9/1999 | Neylan | B23K 26/067 | 219/121.74 |
| 5,984,159 A * | 11/1999 | Ostendarp | B23K 26/073 | 225/93.5 |
| 6,086,366 A * | 7/2000 | Mueller | A61C 1/0046 | 433/29 |
| 6,156,030 A * | 12/2000 | Neev | A61B 18/20 | 606/10 |
| 6,300,594 B1 * | 10/2001 | Kinoshita | B23K 26/073 | 219/121.69 |
| 6,321,003 B1 * | 11/2001 | Kner | H01S 5/06804 | 372/20 |
| 6,590,698 B1 * | 7/2003 | Ohtsuki | G02B 6/14 | 359/326 |
| 6,952,010 B2 * | 10/2005 | Nizani | G02B 6/29361 | 250/216 |
| 7,098,992 B2 * | 8/2006 | Ohtsuki | B23K 26/0643 | 355/53 |
| 7,151,869 B2 * | 12/2006 | Fernando | G01N 21/255 | 385/16 |
| 7,446,793 B2 * | 11/2008 | Inagawa | B41J 2/473 | 347/236 |
| 7,623,282 B2 * | 11/2009 | Oda | G03G 15/043 | 347/232 |
| 7,807,944 B2 * | 10/2010 | Akasaka | B23K 26/032 | 219/121.7 |
| 7,965,916 B2 * | 6/2011 | Furuya | G02B 6/001 | 359/333 |
| 8,610,985 B2 * | 12/2013 | Tsuchiya | G02B 26/101 | 359/213.1 |
| 8,878,067 B2 * | 11/2014 | Tamura | H05K 3/3426 | 174/126.2 |
| 8,929,406 B2 * | 1/2015 | Chuang | G01N 21/84 | 372/21 |
| 9,042,006 B2 * | 5/2015 | Armstrong | H01S 3/2316 | 359/341.1 |
| 9,066,736 B2 * | 6/2015 | Islam | A61B 18/20 | |
| 9,318,869 B2 * | 4/2016 | Chuang | H01S 3/1083 | |
| 9,419,407 B2 * | 8/2016 | Deng | G01J 1/0411 | |
| 9,529,182 B2 * | 12/2016 | Chuang | G02B 17/0892 | |
| 9,608,399 B2 * | 3/2017 | Chuang | G02F 1/353 | |
| 9,724,783 B2 * | 8/2017 | Odagiri | B23K 26/0626 | |
| 9,748,729 B2 * | 8/2017 | Chuang | G01N 21/9501 | |
| 9,804,101 B2 * | 10/2017 | Deng | G01N 21/9501 | |
| 2002/0076134 A1 * | 6/2002 | Singh | G02B 6/3572 | 385/16 |
| 2003/0053744 A1 * | 3/2003 | Makio | G02B 6/2552 | 385/18 |
| 2003/0081192 A1 * | 5/2003 | Nishi | G03B 27/72 | 355/69 |
| 2003/0081886 A1 * | 5/2003 | Wu | G02B 6/352 | 385/18 |
| 2003/0102291 A1 * | 6/2003 | Liu | B23K 26/04 | 219/121.73 |
| 2003/0116545 A1 * | 6/2003 | Kaji | B23K 26/0604 | 219/121.72 |
| 2004/0012844 A1 * | 1/2004 | Ohtsuki | B23K 26/0643 | 359/341.1 |
| 2004/0195222 A1 * | 10/2004 | Tanaka | B23K 26/073 | 219/121.73 |
| 2005/0232316 A1 * | 10/2005 | Akasaka | B23K 26/032 | 372/25 |
| 2006/0012842 A1 * | 1/2006 | Abu-Ageel | G02B 6/0001 | 385/146 |
| 2007/0193984 A1 * | 8/2007 | Kawai | B23K 26/046 | 219/121.63 |
| 2007/0221639 A1 * | 9/2007 | Yoshikawa | B23K 26/032 | 219/121.63 |
| 2008/0253416 A1 * | 10/2008 | Nishikawa | H01S 3/134 | 372/38.01 |
| 2009/0032510 A1 * | 2/2009 | Ando | B23K 26/067 | 219/121.72 |
| 2009/0147811 A1 * | 6/2009 | Furuya | H01S 3/0675 | 372/34 |
| 2009/0245307 A1 * | 10/2009 | Iida | B23K 26/067 | 372/29.014 |
| 2011/0284509 A1 * | 11/2011 | Kreuter | G02B 7/1805 | 219/121.67 |
| 2012/0115316 A1 * | 5/2012 | Park | B23K 26/0673 | 438/487 |
| 2014/0183173 A1 * | 7/2014 | Yeum | B23K 26/24 | 219/121.63 |
| 2015/0014889 A1 * | 1/2015 | Goya | B23K 26/38 | 264/400 |
| 2015/0268040 A1 * | 9/2015 | Izumi | G01B 21/24 | 356/399 |
| 2015/0352666 A1 * | 12/2015 | Fujita | B23K 26/14 | 219/121.61 |
| 2016/0141823 A1 * | 5/2016 | Nishio | H01S 3/0014 | 372/38.02 |

FOREIGN PATENT DOCUMENTS

| | | |
|---|---|---|
| JP | S63-085212 U | 6/1988 |
| JP | H04-034817 Y2 | 8/1992 |
| JP | H06-344170 A | 12/1994 |
| JP | H08-150485 A | 6/1996 |
| JP | H11-142786 A | 5/1999 |
| JP | H11-312831 A | 11/1999 |
| JP | 2002-006122 A | 1/2002 |
| JP | 2010-139991 A | 6/2010 |
| JP | 2016-075786 A | 5/2016 |

OTHER PUBLICATIONS

An Office Action mailed by the German Patent Office dated Dec. 12, 2018, which corresponds to German Patent Application No. 10 2017 218 690.9 and is related to U.S. Appl. No. 15/786,638.

* cited by examiner

BEAM DISTRIBUTOR

This application is based on and claims the benefit of priority from Japanese Patent Application No. 2016-205260, filed on 19 Oct. 2016, the content of which is incorporated herein by reference.

BACKGROUND OF THE INVENTION

Field of the Invention

The present invention relates a beam distributor mounted on a machining apparatus that oscillates laser light (infrared rays) from a laser light source having an output power of 100 W or higher, for example, to perform laser machining such as cutting or welding.

Related Art

In a conventional beam distributor of this type, a technique which employs a method (hereinafter referred to as a "rectilinear method") of parallelly moving a total reflection mirror along an optical axis of an incident beam in order to effectively utilize a laser light source and in which a total reflection mirror is appropriately parallelly moved after capturing a laser light oscillated from one laser light source from a feed fiber (for example, an optical fiber), thereby branching the laser light into a plurality of process fibers (for example, optical fibers) is proposed (for example, see Patent Documents 1 to 4).

Moreover, since an oscillation frequency of this laser light source is in an infrared region of 900 nm or higher, it is not possible to ascertain where the laser light is travelling with the naked eyes. Due to this, in general, a guide laser of visible light is mounted in a laser light source having an output power of 100 W or higher and visible light is emitted as guide light from this guide laser along the same path as the laser light so that it is possible to ascertain where laser light in an infrared region is travelling with the naked eyes.

Patent Document 1: Japanese Unexamined Patent Application, Publication No. H06-344170
Patent Document 2: Japanese Unexamined Patent Application, Publication No. 2010-139991
Patent Document 3: Japanese Unexamined Patent Application, Publication No. H11-142786
Patent Document 4: Japanese unexamined utility model application, publication No. S63-85212

SUMMARY OF THE INVENTION

However, in a beam distributor, various optical components such as a collimator lens that converts laser light emitted from a feed fiber to parallel light, a reflection mirror that reflects laser light, and a focus lens that collects laser light to a process fiber are used. An AR coating (an anti-reflection film) or a HR coating (a high reflective film) is formed on these optical components in order to transmit or reflect light having the wavelength of the laser light. Such a coating is optimized to the wavelength (the infrared region) of laser light, a power loss of several percents per face generally occurs in visible light.

Due to this, there is an inconvenience that the output power of visible light emitted from the guide laser decreases whenever passing through an optical component and the visibility worsens. Particularly, this inconvenience is remarkable when a large number of optical components are included in a housing.

The present invention has been made in view of such a problem, an object thereof is to provide a rectilinear beam distributor capable of maintaining the visibility of visible light emitted from a guide laser.

(1) A beam distributor (for example, a beam distributor 1 to be described later) includes: a housing (for example, a housing 2 to be described later) through which a beam passes; one or more beam incidence openings (for example, a beam incidence opening 3 to be described later); one or more beam exiting openings (for example, a beam exiting opening 5 to be described later); a beam direction changing unit (for example, a beam direction changing unit 8 to be described later) that changes a direction of a beam incident into the housing from the beam incidence opening so that the beam is guided to the beam exiting opening; a first driving device (for example, a first driving device 10 to be described later) that moves the beam direction changing unit in an optical axis direction of an incident beam (for example, an incident beam 21 to be described later); a position detection device (for example, a position detection device 13 to be described later) that detects a position of the beam direction changing unit; a control device (for example, a control device 15 to be described later) that controls the first driving device; a recording device (for example, a recording device 16 to be described later) that records position information of a position of the position detection device; and a guide laser (for example, a guide laser 9 to be described later) that oscillates a visible light (for example, a visible light 23 to be described later), the control device controlling the first driving device on the basis of a signal from the position detection device and moving the beam direction changing unit to a position corresponding to the position information recorded on the recording device in the optical axis direction of the incident beam so that the incident beam is reflected from the beam direction changing unit and a reflection beam (for example, a reflection beam 22 to be described later) is guided to the beam exiting opening, wherein the beam direction changing unit has a dichroic property that the beam direction changing unit reflects the incident beam and transmits the visible light, and the guide laser is disposed so as to move with movement of the beam direction changing unit in the optical axis direction of the incident beam when oscillating the visible light so that the visible light passes through the beam direction changing unit and an optical axis thereof is identical to an optical axis of the reflection beam.

(2) In the beam distributor according to (1), the beam distributor includes a scattered light sensor (for example, a photodiode 17 to be described later) that detects a scattered light of the reflection beam in the beam exiting opening, and the position information of the recording device may be changed to a value such that a detection value of the scattered light sensor is minimized in a state the reflection beam exits from the beam exiting opening.

(3) In the beam distributor according to (1) or (2), the beam distributor may include a second driving device that drives the beam direction changing unit in a direction vertical to the optical axis of the incident beam.

(4) In the beam distributor according to any one of (1) to (3), one or more optical components that change the direction of the incident beam may be provided between the beam incidence opening and the beam direction changing unit.

(5) In the beam distributor according to any one of (1) to (4), a temperature switch (for example, a temperature switch 14 to be described later) may be provided on a rear side of the beam direction changing unit on an extension line of the optical axis of the incident beam so that whether the beam direction changing unit is burnt is determined on the basis of turning on/off of the temperature switch.

(6) In the beam distributor according to any one of (1) to (5), an elastic member (for example, a coil spring 18 to be described later) is disposed between the housing and the beam direction changing unit, and a stopping member (for example, a stopping member 19 to be described later) is provided to restrict movement of the beam direction changing unit so that when driving force for driving the first driving device is interrupted, the beam direction changing unit may be moved up to the position of the stopping member by elastic force of the elastic member.

(7) In the beam distributor according to any one of (1) to (6), the first driving device may include a ball screw (for example, a ball screw 11 to be described later) and a motor (for example, a motor 12 to be described later).

(8) In the beam distributor according to any one of (1) to (6), the first driving device may include a linear motor.

According to the present invention, since the beam direction changing unit is added to the guide laser of a rectilinear beam distributor, it is possible to minimize the number of optical components through which visible light emitted from the guide laser passes. Therefore, it is possible to suppress a decrease in the output power of the visible light and to maintain the visibility.

DETAILED DESCRIPTION OF THE INVENTION

Figure 1:
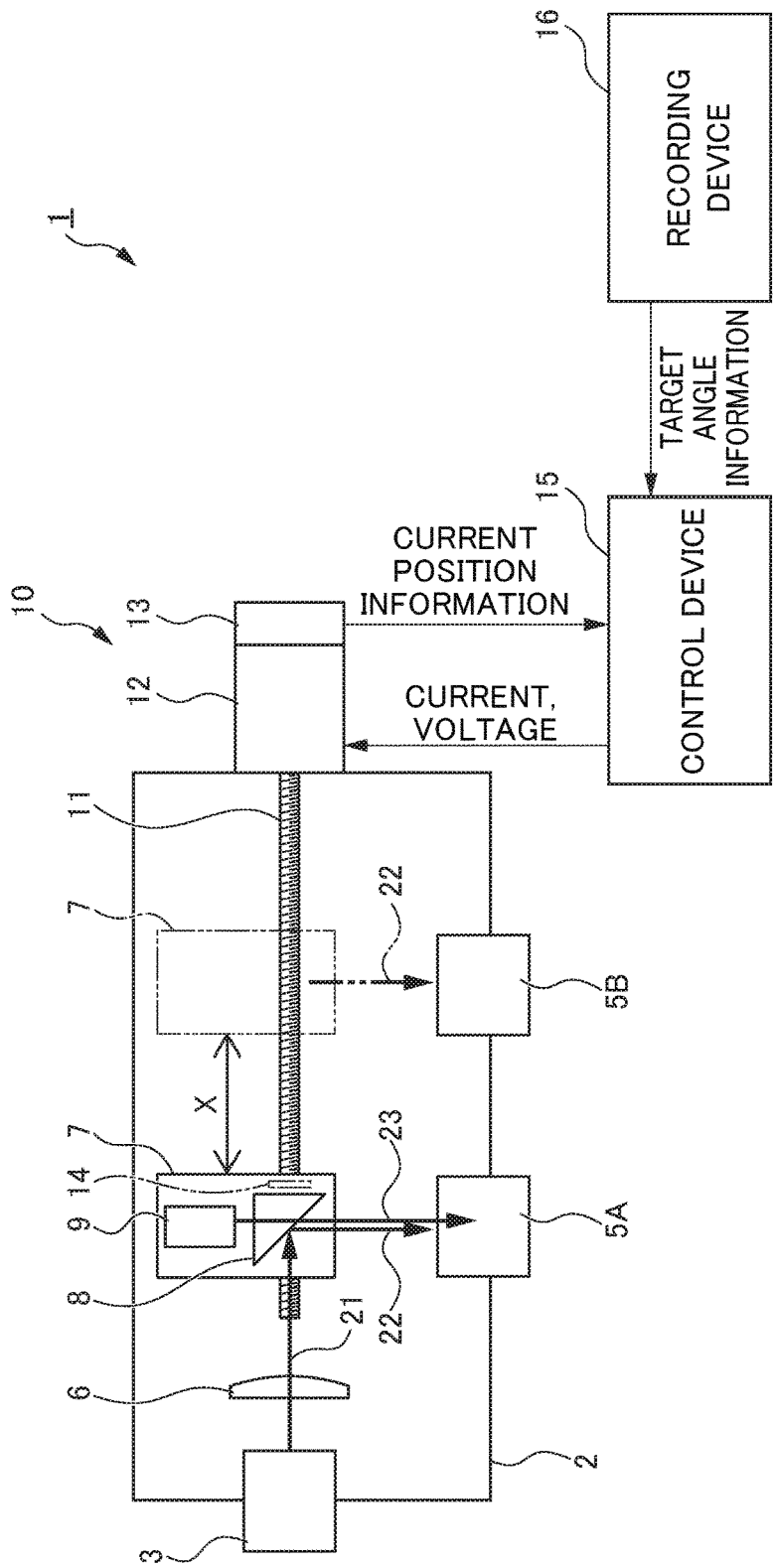
FIG. 1 is a diagram illustrating a configuration of a beam distributor according to a first embodiment of the present invention.

Hereinafter, a first embodiment of the present invention will be described with reference to the drawings. In the description of the second and subsequent embodiments, the same components as those of the first embodiment will be denoted by the same reference numerals, and the description thereof will be omitted.

First Embodiment

FIG. 1 is a diagram illustrating a configuration of a beam distributor according to a first embodiment of the present invention.

As illustrated in FIG. 1, a rectilinear beam distributor 1 includes a housing 2, one beam incidence opening 3, two beam exiting openings 5 (a first beam exiting opening 5A and a second beam exiting opening 5B), a collimator lens 6, a supporting member 7, a beam direction changing unit 8, a guide laser 9, a first driving device 10, a position detection device 13, a control device 15, and a recording device 16. Furthermore, the first driving device 10 includes a ball screw 11 and a motor 12.

Here, as illustrated in FIG. 1, a laser machining beam (an infrared ray) oscillated from a laser light source (not illustrated) passes through the housing 2. The collimator lens 6 converts beam incident from the beam incidence opening 3 to parallel light. The beam direction changing unit 8 and the guide laser 9 are integrally mounted on the supporting member 7. The beam direction changing unit 8 changes the direction of the beam incident from the beam incidence opening 3 into the housing 2 so as to be guided to the beam exiting opening 5.

The guide laser 9 oscillates a visible light 23. The first driving device 10 moves the supporting member 7 on which the beam direction changing unit 8 and the guide laser 9 are mounted in an optical axis direction (an X-direction) of the incident beam 21. The position detection device 13 detects the position of the beam direction changing unit 8 and outputs current position information to the control device 15. The control device 15 supplies current to the motor 12 to control the first driving device 10. The recording device 16 records position information on the position of the position detection device 13 and outputs target angle information to the control device 15.

Moreover, this beam distributor 1 is configured such that the control device 15 controls the first driving device 10 on the basis of a signal from the position detection device 13 so that the beam direction changing unit 8 is moved to a position corresponding to the position information recorded in the recording device 16 in the optical axis direction of the incident beam 21 via the supporting member 7 whereby the incident beam 21 is reflected from the beam direction changing unit 8 and a reflection beam 22 is guided to the beam exiting opening 5.

Furthermore, the beam direction changing unit 8 has a dichroic property that the beam direction changing unit 8 reflects the incident beam (the infrared ray) and transmits the visible light 23. The guide laser 9 is disposed such that when the guide laser 9 oscillates the visible light 23, the guide laser 9 moves with the movement of the beam direction changing unit 8 in the optical axis direction of the incident beam 21 so that the visible light 23 passes through the beam direction changing unit 8 and the optical axis thereof is identical to the optical axis of the reflection beam 22.

When light is guided to the first beam exiting opening 5A using this beam distributor 1, the motor 12 is driven to rotate the ball screw 11 on the basis a command from the control device 15 so that the beam direction changing unit 8 is positioned at a predetermined position (a position facing the first beam exiting opening 5A) via the supporting member 7 as indicated by a solid line in FIG. 1. By doing so, the incident beam 21 incident from the beam incidence opening 3 is reflected from the beam direction changing unit 8 and is guided to the first beam exiting opening 5A as the reflection beam 22.

In this case, as described above, since the beam direction changing unit 8 transmits the visible light 23, the visible light 23 oscillated from the guide laser 9 is guided to the first beam exiting opening 5A in a state in which the optical axis thereof is identical to the optical axis of the reflection beam 22 after passing through the beam direction changing unit 8. As a result, this visible light 23 enables users to ascertain where the reflection beam 22 is travelling with the naked eyes.

Furthermore, the visible light 23 passes through only the beam direction changing unit 8 while the visible light 23 travels from the guide laser 9 to reach the first beam exiting opening 5A. Therefore, it is possible to suppress a decrease in the output power of the visible light 23 resulting from the visible light 23 passing through a plurality of optical components (the collimator lens 6 and the like) and to maintain the visibility.

Moreover, when light is guided to the second beam exiting opening 5B, the motor 12 is driven to rotate the ball screw 11 on the basis of a command from the control device 15 so that the beam direction changing unit 8 is positioned at a predetermined position (a position facing the second beam exiting opening 5B) via the supporting member 7 as indicated by a two-dot chain line in FIG. 1. By doing so, the incident beam 21 incident from the beam incidence opening 3 is reflected from the beam direction changing unit 8 and is guided to the second beam exiting opening 5B as the reflection beam 22.

In this case, the visible light 23 oscillated from the guide laser 9 is guided to the second beam exiting opening 5B in a state in which the optical axis thereof is identical to the optical axis of the reflection beam 22 after passing through the beam direction changing unit 8. As a result, the visible light 23 enables users to ascertain where the reflection beam 22 is travelling with the naked eyes.

Furthermore, the visible light 23 passes through only the beam direction changing unit 8 while the visible light 23 travels from the guide laser 9 to reach the second beam exiting opening 5B. Therefore, it is possible to suppress a decrease in the output power of the visible light 23 resulting from the visible light 23 passing through a plurality of optical components and to maintain the visibility.

As described above, in the rectilinear beam distributor 1, since it is possible to minimize the number of optical components through which the visible light 23 emitted from the guide laser 9 passes regardless of the position of the beam direction changing unit 8 (since the visible light 23 passes through the beam direction changing unit 8 only), it is possible to suppress a decrease in the output power of the visible light 23 and to maintain the visibility.

Furthermore, since the guide laser 9 and the beam direction changing unit 8 are integrated, it is possible to simplify the configuration of the beam distributor 1 and to improve the maintenance of the guide laser 9 which is a component having a finite service life.

Moreover, since the first driving device 10 includes the ball screw 11 and the motor 12, it is possible to control the position of the beam direction changing unit 8 with high accuracy when distributing a beam.

Second Embodiment

Figure 2:
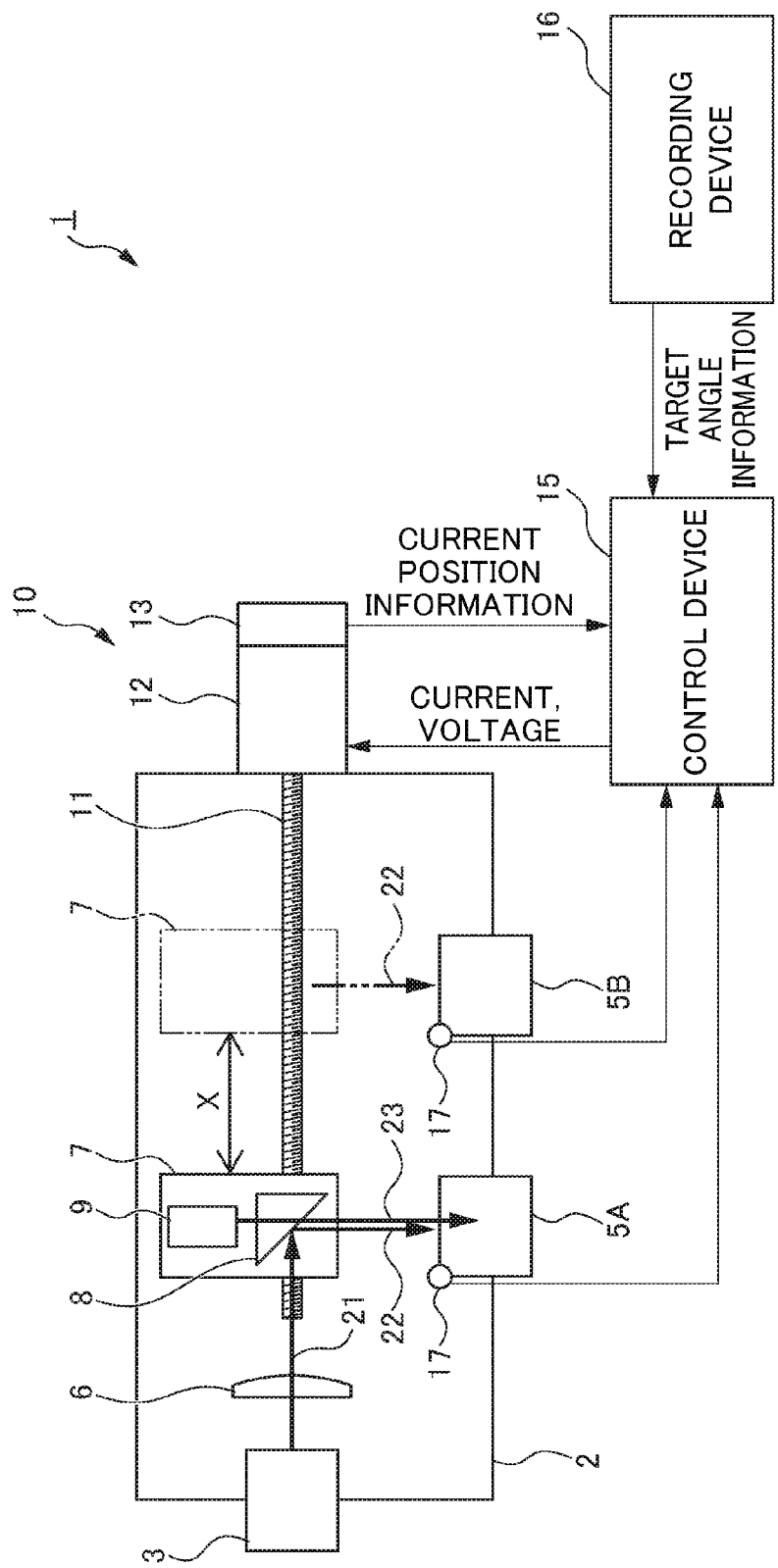
FIG. 2 is a diagram illustrating a configuration of a beam distributor according to a second embodiment of the present invention.

FIG. 2 is a diagram illustrating a configuration of a beam distributor according to a second embodiment of the present invention.

As illustrated in FIG. 2, in this beam distributor 1, a photodiode 17 as a scattered light sensor that detects scattered light of a reflection beam 22 in the beam exiting opening 5 is provided in each beam exiting openings 5, and the position information of the recording device 16 is changed to a value such that the detection value of the photodiode 17 is minimized in a state in which the reflection beam 22 exits from the beam exiting opening 5. Since the other components are basically similar to those of the first embodiment, the same members will be denoted by the same reference numerals, and the description thereof will be omitted.

Therefore, the second embodiment provides the same operational effects as those of the first embodiment. In addition to this, in the second embodiment, since the presence of a positional shift of the beam direction changing unit 8 is determined on the basis of detection of scattered light, it is possible to automatically correct the positional shift even if a positional shift of the beam direction changing unit 8 occurs due to driving of the first driving device 10. As a result, it is possible to suppress a decrease in coupling efficiency (the percentage of the output power of laser light at the beam exiting opening 5 to the output power of laser light at the beam incidence opening 3) due to a positional shift of the beam direction changing unit 8.

Third Embodiment

Figure 3:
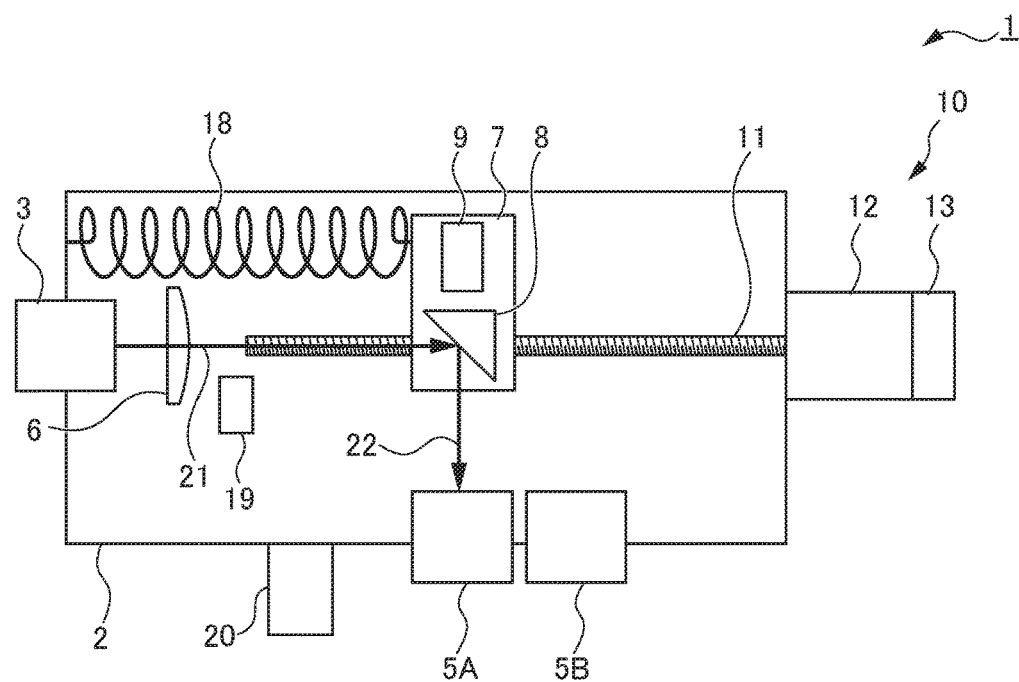
FIG. 3 is a diagram illustrating the state during operation of a beam distributor according to a third embodiment of the present invention.
Figure 4:
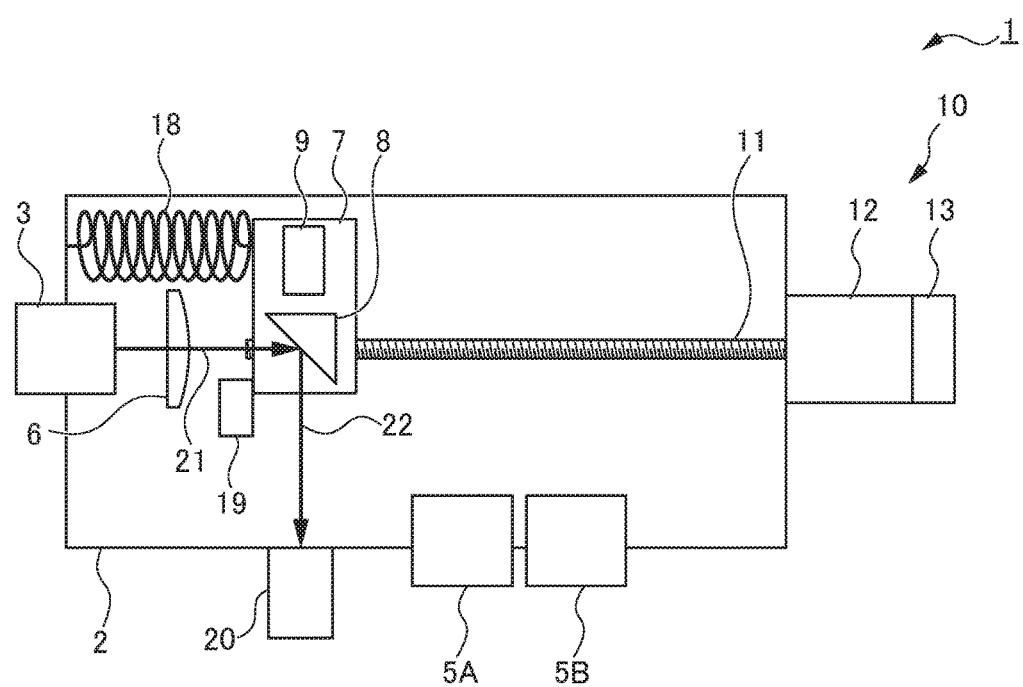
FIG. 4 is a diagram illustrating the state during emergency of the beam distributor according to the third embodiment of the present invention.

FIG. 3 is a diagram illustrating the state during operation of a beam distributor according to a third embodiment of the present invention. FIG. 4 is a diagram illustrating the state during emergency of the beam distributor according to the third embodiment of the present invention. In FIGS. 3 and 4, the control device 15 and the recording device 16 are not illustrated.

As illustrated in FIGS. 3 and 4, in this beam distributor 1, a coil spring 18 as an elastic member is disposed between the housing 2 and the beam direction changing unit 8, and a stopping member (a stopper) 19 that restricts movement of the beam direction changing unit 8 is provided. Rubber, a shock absorber, and the like are preferably used as the stopping member 19 in order to alleviate an impact when the beam direction changing unit 8 stops. When driving force for driving the first driving device 10 is interrupted due to failure of the first driving device 10 or the control device 15 and other reasons, the beam direction changing unit 8 is configured to move up to the position of the stopping member 19 by the elastic force of the coil spring 18. Furthermore, as illustrated in FIG. 4, a beam absorber 20 is disposed in the housing 2 in a travelling direction of the reflection beam 22 when the beam direction changing unit 8 is at the position of the stopping member 19. Since the other components are basically similar to those of the first embodiment, the same members will be denoted by the same reference numerals, and the description thereof will be omitted.

Therefore, the third embodiment provides the same operational effects as those of the first embodiment. In addition to this, in the third embodiment, in an emergency situation in which the driving force for driving the first driving device 10 is interrupted, the beam direction changing unit 8 can be moved by the functions of the coil spring 18 and the stopping member 19 and the reflection beam 22 can be absorbed by the beam absorber 20. Due to this, a beam does not leak outside the beam distributor 1, therefore it is possible to enhance the safety during emergency of the beam distributor 1.

The present invention is not limited to the first to third embodiments, and modifications and improvements within a range where the object of the present invention can be achieved fall within the present invention.

In the first to third embodiments, the rectilinear beam distributor 1 having the first driving device 10 that moves the supporting member 7 having the beam direction changing unit 8 and the guide laser 9 mounted thereon in the optical axis direction of the incident beam 21 has been described. However, in addition to this beam distributor 1, a second driving device (not illustrated) that drives the beam direction changing unit 8 in a direction vertical to the optical axis of the incident beam 21 may be provided. By doing so, since the beam direction changing unit 8 can be moved on a two-dimensional plane, it is possible to allow a beam incident from any one of the plurality of beam incidence openings 3 to exit from any one of the plurality of beam exiting openings 5.

In this case, the second driving device is not necessarily provided separately from the first driving device 10. For example, when the beam direction changing unit 8 is mounted on an XY table (not illustrated) that serves as both the first driving device 10 and the second driving device, it is possible to move the beam direction changing unit 8 in both X and Y directions.

In the first to third embodiments, a case in which the collimator lens 6 only is provided between the beam incidence opening 3 and the beam direction changing unit 8 (on the optical axis of the incident beam 21) has been described. However, an optical component (for example, a total reflection mirror, a prism, and the like) that changes the direction of the incident beam 21 may be provided between the beam incidence opening 3 and the beam direction changing unit 8. In this case, since the direction of the incident beam 21 can be changed by the optical component, it is possible to change the connection direction of a feed fiber connected to the beam incidence opening 3 and to enhance the convenience of the beam distributor 1.

In the first embodiment, as indicated by a two-dot chain line in FIG. 1, a temperature switch 14 may be provided on a rear side of the beam direction changing unit 8 on an extension line of the optical axis of the incident beam 21 so that whether the beam direction changing unit 8 is burnt can be determined on the basis of turning on/off of the temperature switch 14. By doing so, it is possible to easily detect burning of the beam direction changing unit 8.

In the second and third embodiments, naturally, the temperature switch 14 may be provided similarly so that burning of the beam direction changing unit 8 can be detected easily.

In the first to third embodiments, although the first driving device 10 including the ball screw 11 and the motor 12 has been described, the first driving device 10 having the other components may be employed. For example, the first driving device 10 including a linear motor may be used. In this case, it is possible to drive the beam direction changing unit 8 at a high speed using the linear motor when distributing a beam.

In the first to third embodiments, the reflection beam 22 may be collected by a focus lens (not illustrated) and then be guided to the beam exiting opening 5.

In the third embodiment, although a case in which the coil spring 18 is used as the elastic member has been described, a constant load spring or the like may be employed instead of the coil spring 18.

In the third embodiment, a case in which the beam absorber 20 is disposed in the housing 2 in order to enhance the safety during emergency of the beam distributor 1 has been described. However, a temperature switch may be used instead of or in addition to the beam absorber 20 so that occurrence of interruption of driving force to the first driving device 10, failure of the first driving device 10, or the like is detected by the temperature switch.

EXPLANATION OF REFERENCE NUMERALS

1 Beam distributor
2 Housing
3 Beam incidence opening
5 Beam exiting opening
8 Beam direction changing unit
9 Guide laser
10 First driving device
11 Ball screw
12 Motor
13 Position detection device
14 Temperature switch
15 Control device
16 Recording device
17 Photodiode (Scattered light sensor)
18 Coil spring (Elastic member)
19 Stopping member
21 Incident beam
22 Reflection beam
23 Visible light

What is claimed is:

1. A beam distributor comprising:
a housing through which a beam passes;
one or more beam incidence openings;
one or more beam exiting openings;
a beam director that changes a direction of a beam incident into the housing from the beam incidence opening so that the beam is guided to the beam exiting opening, the beam director movable to a plurality of positions;
a first drive that moves the beam director in an optical axis direction of an incident beam from a first one of the plurality of positions to a second one of the plurality of positions;
and
a guide laser that oscillates a visible light positioned on and movable with the beam director,
wherein
the beam director has a dichroic property that the beam director reflects the incident beam and transmits the visible light, and
the guide laser is disposed so as to move with movement of the beam director from the first one of the plurality of positions to the second one of the plurality of positions in the optical axis direction of the incident beam when oscillating the visible light so that the visible light passes through the beam director and an optical axis thereof is identical to an optical axis of the reflection beam.

2. The beam distributor according to claim 1, wherein
the beam distributor includes a scattered light sensor that detects a scattered light of the reflection beam in the beam exiting opening, and
when the beam director is in one of the first one of the plurality of positions and the second one of the plurality of positions, the one of the first one of the plurality of positions and the second one of the plurality of positions is changed such that a detection value of the scattered light sensor is minimized in a state the reflection beam exits from the beam exiting opening.

3. The beam distributor according to claim 1, wherein
the beam distributor includes a second drive that drives the beam director in a direction vertical to the optical axis of the incident beam.

4. The beam distributor according to claim 1, wherein
one or more optical components that change the direction of the incident beam are provided at a location that is directly between the beam incidence opening and the movable beam director.

5. The beam distributor according to claim 1, wherein
a temperature switch is provided on a rear side of the beam director on an extension line of the optical axis of the incident beam so that whether the beam director is burnt is determined on the basis of turning on/off of the temperature switch.

6. The beam distributor according to claim 1, wherein an elastic member is disposed between the housing and the beam director, and a stop is provided to restrict movement of the beam director so that when driving force for driving the first drive is interrupted, the beam director is moved up to the position of the stop by elastic force of the elastic member.

7. The beam distributor according to claim 1, wherein the first drive includes a ball screw and a motor.

8. The beam distributor according to claim 1, wherein the first drive includes a linear motor.

\* \* \* \* \*